United States Patent [19]

Wright

[11] Patent Number: 4,969,785
[45] Date of Patent: Nov. 13, 1990

[54] FASTENER MANDREL AND METHOD
[75] Inventor: Jewel L. Wright, Santa Ana, Calif.
[73] Assignee: Textron, Inc., Providence, R.I.
[21] Appl. No.: 430,295
[22] Filed: Nov. 1, 1989
[51] Int. Cl.⁵ ............................................. F16B 13/04
[52] U.S. Cl. ........................................ 411/43; 411/34; 411/70
[58] Field of Search .................................. 411/34-38, 411/43, 69, 70

[56] References Cited

U.S. PATENT DOCUMENTS

| | | |
|---|---|---|
| 2,030,171 | 2/1936 | Huck .................................. 411/34 X |
| 2,435,144 | 1/1948 | Kubicki .................................. 411/34 |
| 2,955,505 | 10/1960 | Schuster . |
| 3,038,626 | 6/1962 | Simmons .......................... 411/43 X |
| 3,073,205 | 1/1963 | Siebol .................................. 411/43 |
| 3,114,921 | 12/1963 | Carusi . |
| 3,148,578 | 9/1964 | Gapp . |
| 3,178,989 | 4/1965 | Siebol . |
| 3,194,106 | 7/1965 | Carusi et al. . |
| 3,215,024 | 11/1965 | Brilmyer et al. . |
| 3,230,818 | 1/1966 | Siebol . |
| 3,277,771 | 10/1966 | Reynolds . |
| 3,285,121 | 11/1966 | Siebol . |
| 3,292,482 | 12/1966 | Fry et al. . |
| 3,377,907 | 4/1968 | Hurd . |
| 4,137,017 | 2/1979 | Siebol .................................... 411/43 |
| 4,609,317 | 9/1986 | Dixon et al. ...................... 411/43 X |
| 4,702,655 | 10/1987 | Kendall ................................. 411/43 |
| 4,846,611 | 7/1989 | Sadri et al. ........................... 411/43 |

FOREIGN PATENT DOCUMENTS 759761 1/1972 U.S.S.R. .
2177770 7/1986 United Kingdom .

Primary Examiner—Gary L. Smith
Assistant Examiner—Suzanne L. Dino
Attorney, Agent, or Firm—Knobbe, Martens, Olson & Bear

[57] ABSTRACT

A fastener for securely fastening a plurality of members having a sleeve with a generally tubular portion and a flange extending radially from one end of the tubular portion and having a mandrel with an enlarged head and a generally cylindrical stem, the stem having a grooved locking section in which the locking groove has a longitudinal component and an adjacent tapered section containing a breakneck groove, the tapered section tapering radially outward toward the mandrel head and ending in a shoulder having an outer diameter signal to or greater than that of the locking section to provide a surface for improved retention of the mandrel with respect to the sleeve when the fastener is installed.

17 Claims, 3 Drawing Sheets

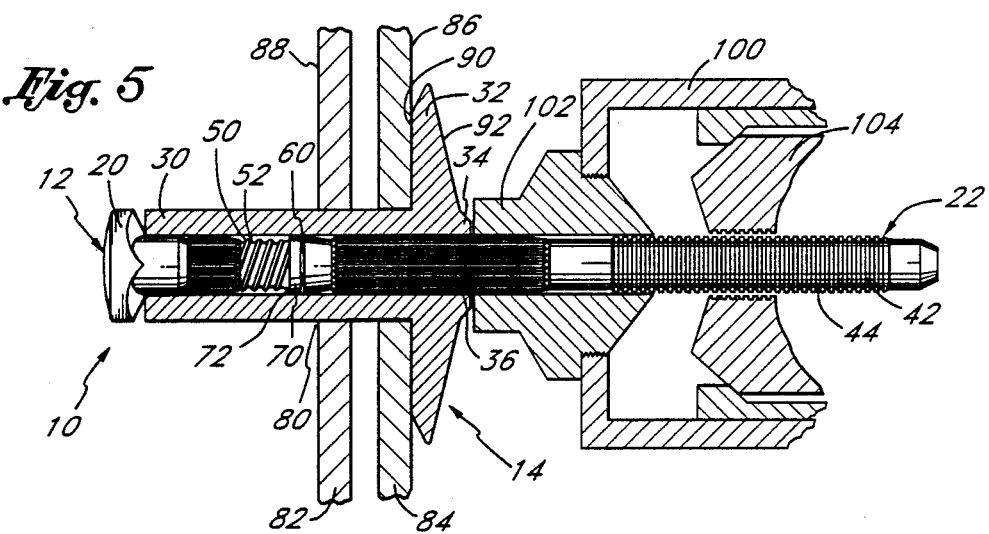
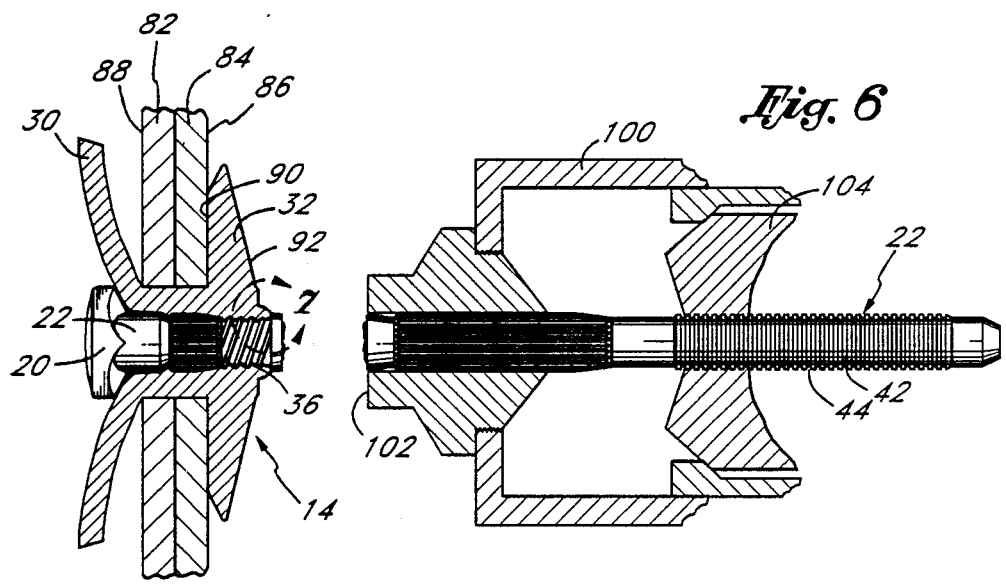
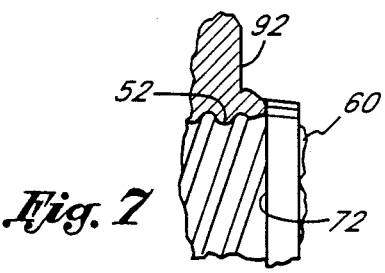

FASTENER MANDREL AND METHOD

BACKGROUND OF THE INVENTION

This invention relates in general to fasteners, and more invention relates in general to fasteners, and more particularly to an improved fastener mandrel and method for securing the fastener mandrel with relation to the fastener sleeve.

A blind rivet is generally composed of two pieces. The first piece is the mandrel, which is composed of a cylindrical stem having an enlarged head at one end. The second piece is the sleeve, a generally tubular member surrounding a portion of the mandrel stem and abutting the mandrel head, with an outwardly protruding flange at the end opposite the mandrel head.

In use, such a fastener is typically placed in the pulling head of the powered fastener installation device and directed to the workpiece, which commonly consists of a plurality of members to be fastened. In other instances, the fastener is placed in the workpiece and the powered fastener installation device is then applied to it. In either case, the stem of the fastener is gripped by the jaws of the fastener installation device pulling head, which is then operated by hydraulic pressure to clamp the jaws radially about the fastener stem and pull the stem rearward away from the workpiece. At the same time, a reactive force is applied to the sleeve flange, urging it forward against the workpiece. The tension on the stem pulls the stem head against the sleeve, thereby upsetting the sleeve.

Once the sleeve has been upset, the sleeve flange and mandrel head clamp the members of the workpiece together. After the fastener sleeve is upset in the manner described above, and the workpiece members are clinched together, resistance to the stem movement, and thus tension in the stem, increases under the continued application of the pulling force.

Continued application of a compression load on the sleeve flange causes the bore of the sleeve to constrict as material flows inward toward the mandrel stem. The sleeve material that flows inward into the locking grooves creates an interference fit that inhibits withdrawal of the mandrel from the sleeve.

The stem is provided with a locking section having grooves thereon. The locking grooves may take the form of one or more annular grooves, as shown, for example, in U.S. Pat. No. 3,230,818 to G. Siebol. It has been found, however, that a thread-like spiral locking groove is preferable to annular grooves. Although a locking section having a spiral locking groove may not provide as high an installed mandrel retention load (the force required to pull an installed mandrel out of its sleeve) as one having annular grooves, the installed mandrel retention load will be uniform along the length of the spiral locking groove. On the other hand, in a locking section having annular grooves, the installed mandrel retention load depends on where the locking section is located when the sleeve is deformed to effect mandrel retention. Obviously, the material will not flow into the ridges between locking grooves. The annular ridges can, therefore, provide an area in which there is little if any resistance to withdrawal of the mandrel. In a locking section with a spiral locking groove, those areas of minimal resistance are distributed lengthwise along the locking section.

Spiral locking grooves offer an additional advantage over annular grooves. The edges of a spiral locking groove are significantly less likely to abrade the sleeve bore than the edges of an annular locking groove. Annular locking grooves may tend to break small chips of material off the inside of the sleeve during installation of the fastener. These chips may accumulate in the fastener installation device and, eventually, clog the device. The material buildup, tool damage and resulting downtime can be quite expensive.

It is conventional in the art to provide the stem with a weakened section, termed a "breakneck" groove. The mandrel stem is designed to fracture at the breakneck groove when the tension reaches a predetermined maximum load during installation, whereupon the gripping section of the stem separates from the remainder of the stem disposed within the sleeve. As is commonly known in the art, the breakneck groove is formed in a two-step rolling process. First, the groove is notched into the mandrel blank. This process creates bulges or ridges of material displaced on either side of the groove which present relatively sharp corners. If these ridges were not removed, they would scoop material from the sleeve bore during installation, creating chips of material that may clog the fastener installation device, as discussed above. Accordingly, the stem is rolled so that the area next to the breakneck groove is rolled down and the groove is rolled almost completely shut, thereby reducing any sharp corners that could catch the sleeve bore.

The prior art has long sought to improve the installed mandrel retention load of fasteners. These efforts have focused on ways to improve the flow of material from the sleeve into the grooves in the mandrel stem locking section. One approach has been to apply axial force to the fastener sleeve flange with a pulling head nosepiece having a sharp protruding configuration which acts to stake material from the sleeve into the locking grooves. An example of this approach is the Cherry T Rivet. ® Use of such an arrangement, however, may result in the production of tiny chips of material, which are broken from the sleeve during displacement of the sleeve material by the pulling head nosepiece. As discussed above, these tiny chips are quite detrimental. In addition, such sharp protruding nosepieces are relatively expensive, and their use renders the fastener installation process sensitive to wear or damage to the nosepiece. An incorrect, worn or broken sharp protruding nosepiece will preclude obtaining the proper interference fit between the sleeve and mandrel during installation of the fastener. The sharp protruding nosepiece tends to wear and break much more quickly than a planar nosepiece, which causes problems both due to inadequate fastener installation, increased cost of nosepiece replacement, and increased downtime. Because the operators of such equipment may be relatively unskilled, the worn or broken nosepiece may go unnoticed. Thus, a large number of fasteners may be improperly installed before the defective nosepiece is discovered. This can lead to weak joints or complete "pop-out" of the mandrels, in either case resulting in expensive repair of the workpiece with concomitant downtime.

The traditional problems with specially configured fastener installation tool nosepieces have been exacerbated by the recent application of powered fastener installation devices to automated assembly. These robot-mounted devices require a sturdy and simple design of the nosepiece so as to reduce the potential for error and downtime. The high installation volume and inability of the automated power fastener installation device to detect defects in the nosepiece render this problem critical.

The problems associated with the sharp protruding nosepiece have been reduced by use of a special fastener sleeve configuration, as disclosed in my co-pending patent application, Ser. No. 217,318, entitled "Fastener With Integral Locking Means," the disclosure of which is hereby incorporated by reference. Nevertheless, the need remains to improve the installed mandrel retention load of such fasteners. Accordingly, there exists a need for enhancing the interference between an installed fastener sleeve and mandrel having a spiral lock groove.

SUMMARY OF THE INVENTION

The fastener of the present invention has a sleeve that is defined by a generally tubular portion and a flange extending radially outwardly from one end of the tubular portion and a mandrel that is defined by an enlarged head and a generally cylindrical stem. The mandrel stem of the fastener of the present invention has a grooved locking section proximate the head, the grooves of which have a longitudinal component, a serrated gripping section distal the head, and a tapered section interposed between the locking section and the gripping section. Disposed within the tapered section is an annular breakneck groove. The periphery of the tapered section is tapered along its length radially outwardly toward the head. The end of the tapered section proximate the locking section is defined by a shoulder having an outer diameter equal to or greater than the outer diameter of the locking section. The shoulder enhances retention of the mandrel in position with respect to the sleeve.

The grooves of the locking section may be provided by longitudinal knurling or other forms, but are preferably provided by a thread-like spiral locking groove. The tapered section is preferably tapered on a straight taper at an angle of between 2° to 10° from the longitudinal axis of the stem. In a particularly preferred embodiment, the tapered section is tapered at an angle of between 3° to 3¼° degrees from the longitudinal axis of the stem.

Another embodiment of the fastener of the present invention contains a sleeve that is defined by a generally tubular portion and a flange extending radially outwardly from one end of the tubular portion and a mandrel that is defined by an enlarged head and a generally cylindrical stem. The stem has proximate the head a locking section having disposed about its periphery a groove having a longitudinal component. Although this groove may be provided by longitudinal knurling or other forms, it is particularly preferred that the groove be provided by a thread-like spiral locking groove. The stem also contains an annular breakneck groove disposed therearound proximate the locking section but distal the head. The stem also has a shoulder facing the head disposed between the breakneck groove and locking section and having an outer diameter equal to or greater than the outer diameter of the locking section. That shoulder is for locking the mandrel in position with respect to the sleeve.

The present invention also encompasses a method of fastening a plurality of members having holes therethrough. That method includes the steps of providing a mandrel with an enlarged head and a generally cylindrical stem having a grooved locking section proximate the head and a tapered section adjacent the locking section distal said head, the tapered section being tapered radially outwardly toward the head and having an annular breakneck groove disposed therein and a shoulder defining the end of the tapered section between the breakneck groove and the locking section. The method also includes the step of providing a sleeve with a generally tubular portion abutting the head and surrounding a portion of the stem adjacent the head and a flange extending radially outward from the end of the tubular portion opposite the head having an axially inner face adjacent the tubular portion and an axially outer face distal the tubular portion. The method also includes the steps of aligning the holes through the members, inserting the fastener mandrel head and sleeve tubular portion into the holes through the members, placing a powered fastener installation device nosepiece about the mandrel stem and against the flange outer face, gripping the mandrel stem with jaws provided in the powered fastener installation device, and simultaneously pulling the mandrel stem axially away from the workpiece and compressing the sleeve axially toward the workpiece. The method of the present invention also includes the steps of upsetting the sleeve tubular portion, compressing the members, displacing material from the sleeve into the groove in the locking section and against the tapered section shoulder, thereby locking the mandrel with respect to the sleeve and preventing unfastening of the members. The final step of the method is breaking the mandrel stem at the breakneck groove.

The fastener, mandrel and method of this invention exhibit improved retention of the mandrel with respect to the sleeve in the installed fastener. In addition, the fastener, mandrel and method of this invention avoid the need for a sharp protruding nosepiece on the fastener installation device, thereby eliminating the production of potentially harmful chips. Additional objects and benefits of the invention will become apparent from the detailed description and drawings that follow.

Finally, the present invention also encompasses a joint formed in a plurality of adjacent members having aligned holes therethrough and a front surface and a rear surface. The joint of the present invention includes a sleeve having a generally tubular portion within the holes through said members with spaced first and second ends. Extending radially outwardly from the first end of said tubular portion is a flange which abuts the front surface of the members. The second end of the sleeve tubular portion protrudes beyond the rear surface and is upset. The joint also includes a mandrel having an enlarged head proximate the rear surface of the members and a generally cylindrical stem extending from the head through the sleeve and ending in a broken end. The stem has a locking section with a locking groove having a longitudinal component The stem also has a shoulder facing the head disposed between the broken end and locking section. The shoulder has an outer diameter equal to or greater than the outer diameter of the locking section. The sleeve material substantially fills the locking groove and abuts said shoulder, thereby locking the mandrel in position relative to the sleeve and fastening the members.

BRIEF DESCRIPTION OF THE DRAWINGS

FIG. 5 is a partially cross-sectional view of the fastener of the present invention placed in a workpiece.

FIG. 6 is a partially cross-sectional view of the installed fastener of FIG. 5, showing the powered fastener installation device after the mandrel is broken.

FIG. 7 is a cross-sectional detail view of the breakneck and locking section of FIG. 6.

DETAILED DESCRIPTION OF THE PREFERRED EMBODIMENT

Figure 1:
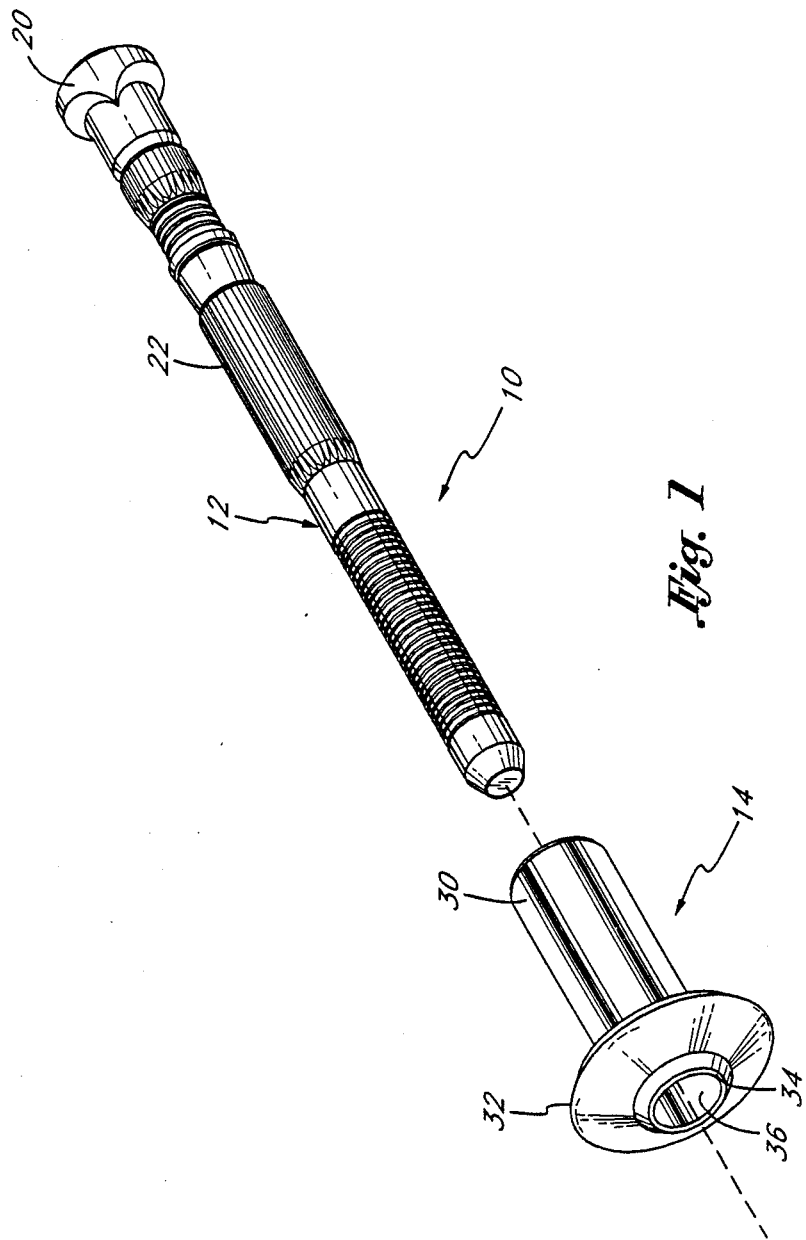
FIG. 1 is an exploded perspective view of the fastener of the preferred embodiment of the present invention.

Referring to FIG. 1, the fastener 10 of the present invention has two pieces, a mandrel 12 and a sleeve 14. The mandrel 12 is composed of two sections, an enlarged head 20 and a generally cylindrical stem 22. The sleeve 14 has two portions, a tubular portion 30 and a disk-like, radially extending flange 32 joined to the end of the tubular portion 30. Extending throughout the sleeve 14 is a cylindrical bore 36. The bore 36, tubular portion 30 and flange 32 are all generally coaxial. The construction and materials, commonly 5056 aluminum alloy, of the sleeve are well known to those of ordinary skill in the art.

As disclosed in my co-pending patent application, Ser. No. 217,318, entitled "Fastener With Integral Locking Means," the sleeve may also be provided with a boss 34 which axially protrudes from the flange 32 opposite the tubular portion 30. The boss 34 urges inward expansion of the sleeve material upon application of axial pressure to the boss 34 and allows use of a relatively flat fastener installation device nosepiece instead of the sharp protruding staking-type nosepiece used with the Cherry T Rivet. ®

Figure 2:
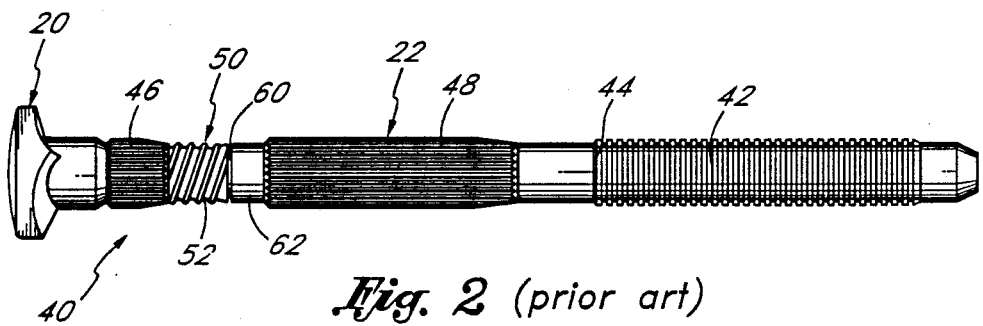
FIG. 2 is a side view of the mandrel of the prior art.

Referring to FIG. 2, a prior art mandrel 40 is shown. The prior art mandrel 40 generally consists of a mandrel head 20 and mandrel stem 22. The mandrel stem 22 has a gripping section 42 for allowing gripping of the mandrel stem 22 by the jaws of the powered fastener installation device. This gripping section 42 may be provided with a surface treatment to enhance the coefficient of friction between the fastener installation device jaws and the gripping section 42 In the particularly preferred embodiment, the gripping section 42 has disposed thereon serrations in the form of annular grooves 44. One of ordinary skill in the art will appreciate alternative means of increasing the coefficient of friction between the jaws and the gripping section 42, and the details of same need no further discussion here.

Disposed between the head 20 and gripping section 42 of the prior art mandrel 40 is a locking section 46. The locking section 46 is provided with locking groove 52 on the surface thereof. The locking groove 52 is adapted to receive material from the sleeve 14 upon axial compression of the sleeve 14 and concomitant reduction of the sleeve bore 36, so as to provide an interference fit between the locking section 50 of the stem 22 and sleeve 14. The locking groove 52 of the locking section 50 may be an annular groove, or it may have a longitudinal component, such as, for example, longitudinal knurling or a thread-like spiral locking groove as shown.

Adjacent the locking section 50 is the breakneck groove 60. This annular breakneck groove 60 provides a predetermined location at which the mandrel stem 22 will break upon application of pulling force and installation of the fastener 10. Opposite the locking section 50 from the breakneck groove 60 is the roll-down section 62. This roll-down section 62 is formed by rolling after the breakneck groove 60 is notched and is utilized to provide material to roll the breakneck groove 60 shut as much as possible. This rolling reduces any sharp corners that could carve chips out of the sleeve bore 36.

Figure 3:
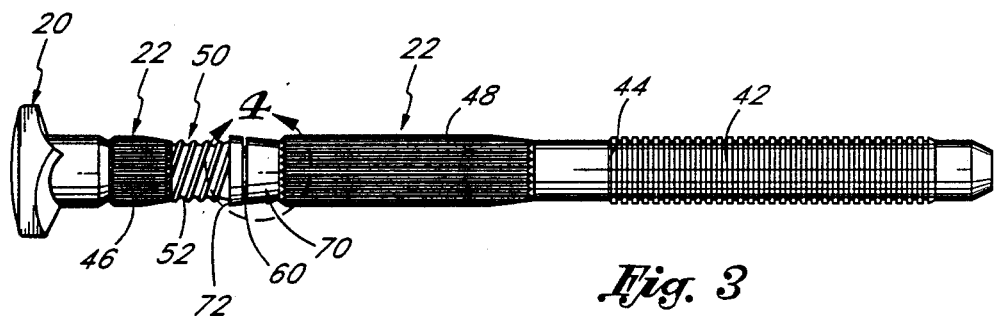
FIG. 3 is a side view of the mandrel of the present invention.

As discussed above, mandrels 40 having annular locking grooves 52 may cause problems by carving out chips from the sleeve bore 36 during installation. Some of the prior art has apparently addressed this problem by using annular locking grooves 52 with steeply-sloped shoulders facing the mandrel head 20 and gently-sloped shoulders facing away from the mandrel head 20. For examples, see U.S. Pat. No. 2,955,505 to M. M. Schuster and U.K. Patent Application No. 2,177,770A to H. Jeal et al. Nevertheless, most of the prior art uses symmetrical annular locking grooves. For examples, see U.S. Pat. No. 3,178,989 to G. Siebol and U.S. Pat. No. 3,292,482 to B. A. G. Fry, et al. The problem of carving out chips from the sleeve bore 36 may be reduced even more effectively, however, by using locking grooves 52 having a longitudinal component, preferably a spiral locking groove 52 as shown in FIG. 3. In the prior art, such spiral locking grooves 52 were either allowed to run out into the annular breakneck groove 60, or were tapered down just before the breakneck groove 60. As a result, a locking section 50 having only a locking groove with a longitudinal component does not contain any annular surface for resisting mandrel withdrawal like the annular shoulder found in locking sections 50 having annular grooves.

The prior art mandrel 40 may include knurled sections 46, 48 to provide a light press fit between the mandrel stem 22 and sleeve bore 36. This press fit keeps the sleeve 14 and mandrel 12 together after the fastener 10 has been assembled and until it is installed.

Referring to FIG. 3, the mandrel 12 of the present invention is shown in detail. Instead of the cylindrical roll-down section 62 of the prior art, a tapered roll-down section 70 is provided on both sides of the breakneck groove 60. The tapered section 70 and breakneck groove 60 are shown in detail in FIG. 4. The angle A of the taper of the tapered section 70 is preferably between 2° to 10° from the longitudinal axis of the stem 22. In the particularly preferred embodiment of the present invention, the angle A of the taper of the tapered section 70 is preferably between 3° to 3½ from the longitudinal axis of the stem 22. This angle allows displacement during rolling of enough material to form a shoulder 72. The taper is preferably a generally straight taper, but one of ordinary skill in the art will appreciate that other forms of tapers may be used. The taper of FIGS. 1 and 3-4 is shown out of scale for purposes of emphasis.

To form the tapered section 70 and shoulder 72, the rolling operation involves two segments. First, the breakneck groove 60 is rolled to the proper depth. This process displaces ridges of material as discussed above. Second, the breakneck groove 60 is rolled back substantially shut. During this second segment, the taper is imparted to the tapered section 70 and the shoulder 72 is rolled into the end of the tapered section 70. During the first segment the spiral locking groove 52 is rolled out into the flat area adjacent the breakneck groove 60. During the second segment, the spiral locking groove 52 is preferably rolled into the shoulder 72. It has been found that flat rolling will not adequately close up the breakneck groove 60 and will leave ridges on the stem 22 that would tend to displace material from the sleeve bore 36 during installation of the fastener 10. On the other hand, too steep a taper is would require excessive reduction in diameter between the breakneck groove 60 and gripping section 42. Therefore, as discussed above, it has been found effective to use a taper between 2° to 10° on the tapered section 70, and it has been found particularly preferable to use between 3 to 3½° taper.

Figure 4:
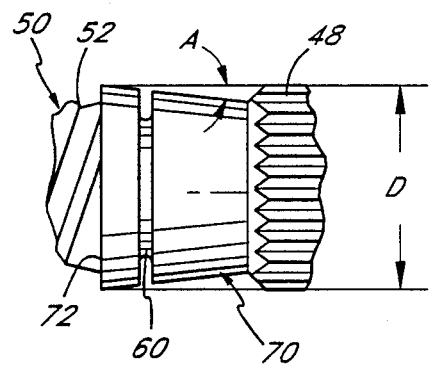
FIG. 4 is a detail view of the breakneck groove and tapered section of the mandrel of FIG. 3.

Referring to FIG. 4, the outer diameter D of the tapered section 70 is preferably equal to or greater than the outer diameter of the locking groove 52 of the locking section 50. As a result, the end of the tapered section 70 closest to the mandrel head 20 is defined by a shoulder 72. The area provided by shoulder 72 is almost completely circular, with the exception of where the crest of locking groove 52 runs into the shoulder 72. The shoulder 72 provides an annular surface which acts to resist withdrawal of the mandrel stem 22 through the sleeve tubular portion 30 after the fastener 10 has been installed. In effect, the shoulder 72 acts as a barb to inhibit withdrawal of the mandrel stem 22 from the sleeve 14. This resistance is due to the fact that material from the sleeve 14 is compressed into the interstices of the locking groove 52 in the locking section 50 and against the shoulder 72. It has been found convenient to make the shoulder 72 substantially perpendicular to the longitudinal axis of the stem 22 and to keep the radius at the bottom of the shoulder 72 as small as possible. Of course, one of ordinary skill in the art will recognize that the radius must be large enough to avoid a stress concentration that will cause the stem 22 to break during installation at the shoulder 72 instead of at the breakneck groove 60 and to avoid failure as a result of fatigue loading. That radius may be easily calculated for a given material and given inner and outer diameters of the shoulder. See, e.g., J. Shigley, *Fundamentals of Mechanical Design* 193-96 (3d ed. 1977).

Referring to FIG. 5, the fastener 10 of the present invention is shown inserted through a workpiece aperture 80. The workpiece aperture 80 is shown as a pair of aligned holes through first and second members 82, 84. The mandrel 12 is inserted through the sleeve 14 so that the mandrel head 20 abuts the sleeve tubular portion 30 opposite the flange 32. The fastener 10 is placed through the aligned aperture 80 in members 82, 84 until the sleeve flange 32 has its inner face 90 placed in abutment with the outer surface 86 of second member 84. The sleeve 30 protrudes beyond the rear surface 90 of the first member 82. FIG. 5 shows the fastener 10 inserted into the workpiece members 82, 84 ready to be installed.

Application of the powered fastener installation device 100 is shown in FIG. 6. To install the fastener 10, the powered fastener installation device 100 is placed about the mandrel stem 22 and against the flange outer face 92. The nosepiece 102 of the powered fastener installation device abuts the flange outer face 92. The nosepiece 102 is shown as planar or flat, but a slight concavity, of 5° for example, may be provided to ease the entry of the fastener 10 into the nosepiece 102. This slight concavity can be of particular importance in robotic installation of fasteners. Of course, this invention could be used with the sharp protruding nosepiece designed for use with the Cherry T Rivet ®, but such a nosepiece is not necessary.

The jaws 104 of the powered fastener installation device 100 are hydraulically or pneumatically actuated to grip the gripping section 42 of the mandrel stem 22. Pressure is then simultaneously applied to the jaws 104 to retract the jaws 104 rearward in the powered fastener installation device 100 and to urge the nosepiece 102 forward against the flange outer face 92. This action simultaneously pulls the mandrel stem 22 axially away from the workpiece members 82, 84 and compresses the sleeve 14 axially toward the workpiece The sleeve tubular portion 30 is upset by the mandrel head 20. The sleeve tubular portion 30 may be upset by collapsing it, as shown in U.S. Pat. No. 3,230,818 to G. Siebol, or by splitting it, as shown in FIG. 6 and in U.S. Pat. No. 3,114,921 to A. Carusi. As the sleeve tubular portion 30 is upset, the workpiece members 82 and 84 are compressed and clinched together. Once the workpiece members 82, 84 are clinched together, the tension on the mandrel stem 22 begins to increase the tensile stress on the mandrel stem 22. Simultaneously, the compression applied to the sleeve flange 32 causes sleeve material to move radially inwardly, thereby constricting the sleeve bore 36. As shown in FIG. 7, this material moves into the locking groove 52 in the locking section 50 of the stem 22 and against the shoulder 72, substantially filling the locking groove 52. Preferably, upon installation of the fastener 10, the shoulder 72 will be flush with the face of the flange outer face 92, or slightly protruding therefrom, as shown in FIG. 7. This movement of material provides an interference fit between the sleeve 14 and mandrel stem 22, thereby securely locking the mandrel 12 with respect to the sleeve 14, fastening the members 82, 84 and creating a joint. Continued application of the pulling force on the stem 22 causes the stem 22 to break at the breakneck groove 60.

Upon breaking of the stem 22, the remaining portion of the stem 22 attempts to spring back so as to relieve the tension therein. The shoulder 72 provides an annular area that abuts the sleeve material urged into the locking groove 52. The shoulder 72 prevents the mandrel stem 22 from springing back, thereby enhancing the retention of the mandrel 12 with respect to the sleeve 14 and improves the tensile and shear strength of the joint.

This invention has been described in detail in connection with certain preferred embodiments, but these are examples only and this invention is not restricted thereto. It will be easily understood by those skilled in the art that other variations and modifications can be easily made within the scope of this invention, and that the invention is to be limited only by the following claims.

What is claimed is:

1. A fastener for securely fastening a plurality of members, comprising:
   a sleeve, having:
      a generally tubular portion with spaced first and second ends; and
      a flange extending radially outwardly from said first end of said tubular portion; and a mandrel, having:
      an enlarged head; and
      a generally cylindrical stem extending from said head through said sleeve having:
      a locking section proximate said head having a locking groove about the periphery thereof; and
      a tapered section adjacent said locking section distal said head having disposed therein an annular breakneck groove, the periphery of said tapered section being tapered radially outwardly toward said head at an angle of between 2°-10° from the longitudinal axis of said stem, the end of said tapered section proximate the locking section having a generally circular periphery of outer diameter equal to or greater than the outer diameter of said locking section and being defined by a substantially annular shoulder facing said head, wherein said sleeve is locked to said mandrel by means of sleeve material displaced into said locking groove by the method comprising the steps of:

aligning the holes through said members;

inserting the fastener mandrel head and sleeve tubular portion into the holes through said members;

placing a powered fastener installation device nosepiece about the mandrel stem and against the flange outer face;

gripping the mandrel stem with jaws provided in the powered fastener installation device;

simultaneously pulling the mandrel stem axially away from the workpiece and compressing the sleeve tubular portion second end axially toward the workpiece;

upsetting the sleeve tubular portion second end; compressing the members;

displacing material from the sleeve into the locking groove and against the tapered section shoulder; and breaking the mandrel stem at the breakneck groove.

2. A fastener for securely fastening a plurality of members, comprising:

a sleeve, having:
  a generally tubular portion with spaced first and second ends; and
  a flange extending radially outwardly from said first end of said tubular portion; and a mandrel, having:
  an enlarged head; and
  a generally cylindrical stem extending from said head through said sleeve tubular portion having:
    a locking section proximate said head having a locking groove about the periphery thereof;
    a gripping section distal said head; and
  a tapered section interposed between said locking section and said gripping section having disposed therein an annular breakneck groove, the periphery of said tapered section being tapered along its length radially outwardly toward said head the end of said tapered section adjacent the locking section being defined by a shoulder facing said head having an outer diameter equal to or greater than the outer diameter of said locking section.

3. The fastener of claim 2, wherein said locking groove is a thread-like spiral locking groove.

4. The fastener of claim 2, wherein said gripping section has a plurality of annular grooves disposed along the outer periphery thereof.

5. The fastener of claim 2, wherein said tapered section is tapered on a straight taper.

6. The fastener of claim 5, wherein said taper has an angle of between 2°–10° from the longitudinal axis of said stem.

7. The fastener of claim 6, wherein said taper has an angle of between 3°–3½° from the longitudinal axis of said stem.

8. A fastener for securely fastening a plurality of members, comprising:

a sleeve, having:
  a generally tubular portion with spaced first and second ends; and
  a flange extending radially outwardly from said first end of said tubular portion; and a mandrel, having:
  an enlarged head; and
  a generally cylindrical stem extending from said head through said sleeve having:
    a locking section proximate said head having disposed about the periphery thereof a locking groove having a longitudinal component;
    an annular breakneck groove proximate said locking section and distal said head; and
    a shoulder facing said head disposed between said breakneck groove and locking section having an outer diameter equal to or greater than the outer diameter of said locking section for locking said mandrel in position with respect to said sleeve.

9. The fastener of claim 8, wherein said locking groove is provided by a thread-like spiral locking groove.

10. In a fastener having a mandrel with an enlarged head and a generally cylindrical stem with a grooved locking section proximate said head and an annular breakneck groove distal said head and having a sleeve with a generally tubular portion abutting said head and surrounding a portion of said stem adjacent said head and a flange extending radially outward from the end of the tubular portion opposite said head with an axially inner face adjacent the tubular portion and an axially outer face distal the tubular portion, the improvement comprising:

a tapered section adjacent said locking section distal said head and surrounding said breakneck groove, said tapered section being tapered radially outwardly toward said head and having a shoulder facing said head defining the end thereof between said breakneck groove and said locking section, whereby said shoulder provides an area circumferentially disposed about said stem for resisting withdrawal of the mandrel from the sleeve after the fastener has been installed.

11. A mandrel for a fastener, comprising:

an enlarged head; and
a generally cylindrical stem having:
  a locking section proximate said head having disposed about the periphery thereof a locking groove having a longitudinal component; and
  a tapered section adjacent said locking section distal said head having disposed therein an annular breakneck groove, the periphery of said tapered section being tapered radially outwardly toward said head at an angle of between 2°–10° from the longitudinal axis of said stem, the end of said tapered section adjacent the locking section having a substantially circular periphery of diameter equal to or greater than the outer diameter of said locking section and being defined by a shoulder, said shoulder facing said head for enhancing retention of said mandrel in position with respect to said sleeve.

12. The mandrel of claim 11, wherein the locking groove is provided by a spiral locking groove.

13. The mandrel of claim 11, wherein the periphery of said tapered section is tapered radially outwardly toward said head at an angle of between 3°–3½° from the longitudinal axis of said stem.

14. A mandrel for a fastener, comprising:
an enlarged head; and
a generally cylindrical stem extending from said head having:
   a breakneck groove spaced from said head for allowing the stem to break at a predetermined location upon application of tension to said stem;
   a locking section between said head and said breakneck groove having disposed about the periphery thereof a locking groove having a longitudinal component; and
   a shoulder facing said head between said breakneck groove and said locking section having an outer diameter greater than or equal to that of said locking section, said shoulder providing a surface for enhancing retention of said mandrel in an installed fastener.

15. A joint, comprising:
a plurality of adjacent members having aligned holes therethrough and a front surface and a rear surface;
a sleeve having a generally tubular portion extending through the holes through said members with spaced first and second ends and having a flange extending radially outwardly from said first end of said tubular portion abutting said front surface, said first end protruding beyond said rear surface being upset; and
a mandrel having an enlarged head proximate said rear surface and a generally cylindrical stem extending from said head through said sleeve having a locking section with a locking groove having a longitudinal component, a broken end distal said head, and a shoulder facing said head disposed between said broken end and locking section having an outer diameter equal to or greater than the outer diameter of said locking section, wherein said sleeve material substantially fills said locking groove and abuts said shoulder, thereby locking said mandrel in position relative to said sleeve and fastening said members.

16. A method of fastening a plurality of members having holes therethrough, comprising the steps:
providing a mandrel with an enlarged head and a generally cylindrical stem extending therefrom having a grooved locking section proximate said head and a tapered section adjacent said locking section distal said head, said tapered section being tapered radially outwardly toward said head and having an annular breakneck groove disposed therein and a shoulder defining the end thereof between said breakneck groove and said locking section;
providing a sleeve with a generally tubular portion abutting said head and surrounding a portion of said stem adjacent said head, a flange extending radially outward from the end of the tubular portion opposite said head having an axially inner face adjacent the tubular portion and an axially outer face distal the tubular portion;
aligning the holes through said members;
inserting the fastener mandrel head and sleeve tubular portion into the holes through said members;
placing a powered fastener installation device nosepiece about the mandrel stem and against the flange outer face;
gripping the mandrel stem with jaws provided in the powered fastener installation device;
simultaneously pulling the mandrel stem axially away from the workpiece and compressing the sleeve axially toward the workpiece;
upsetting the sleeve tubular portion;
compressing the members;
displacing material from the sleeve into the locking groove and against the tapered section shoulder, thereby locking said mandrel with respect to said sleeve and preventing unfastening of said members; and
breaking the mandrel stem at the breakneck groove.

17. A method of using a powered fastener installation device to fasten a plurality of members having holes therethrough, comprising the steps:
providing a sleeve with a generally tubular portion with spaced first and second ends and a flange extending radially outwardly from said first end of said tubular portion;
providing a mandrel with an enlarged head and a generally cylindrical stem extending from said head through said sleeve, said stem having a locking section proximate said head with a locking groove having a longitudinal component, an annular breakneck groove proximate said locking section and distal said head, and a shoulder facing said head disposed between said breakneck groove and locking section having an outer diameter equal to or greater than the outer diameter of said locking section;
aligning the holes through said members;
assembling the fastener by inserting the mandrel stem through said sleeve tubular portion until said mandrel head abuts said sleeve tubular portion second end and said stem protrudes beyond said flange;
inserting the fastener mandrel head and sleeve tubular portion into the holes through said members;
placing a powered fastener installation device nosepiece about the mandrel stem and against said flange;
gripping the mandrel stem with the powered fastener installation device;
simultaneously pulling the mandrel stem axially away from the workpiece and compressing the sleeve axially toward the workpiece;
upsetting the sleeve tubular portion;
compressing the members;
displacing material from the sleeve into the locking groove and against the shoulder; and
breaking the mandrel stem at the breakneck groove.

* * * * *